March 15, 1966  E. CONDOLIOS  3,240,336
PROCESS AND APPARATUS FOR HYDRAULICALLY SORTING A
MIXTURE CONTAINING FINE PARTICULATE MATERIAL
Filed Jan. 2, 1962  3 Sheets-Sheet 1

INVENTOR.
ELIE CONDOLIOS
BY
ATTORNEYS 3,240,336
PROCESS AND APPARATUS FOR HYDRAULICALLY SORTING A MIXTURE CONTAINING FINE PARTICULATE MATERIAL
Elie Condolios, Grenoble, Isere, France, assignor to Societe Grenobloise d'Etudes et d'Applications Hydrauliques, Grenoble, France, a corporation of the French Republic
Filed Jan. 2, 1962, Ser. No. 163,587
Claims priority, application France, Jan. 6, 1961, 4,326
20 Claims. (Cl. 209—157)

The present invention relates to the sorting or classifying of particles of solid materials according to the differences in the relative densities of the particles and/or the differences in the sizes of the particles, and has for its primary purpose the provision of a method and apparatus which will enable the sorting or classification of particles of densities and grain sizes below that heretofore considered possible.

The art has devised a number of hydraulic processes utilizing the idea of velocity of fall of the solid particles in a liquid medium to separate the same. Thus, in accordance with one type of practice, a mixture of particulate material is deposited into a liquid stream at the entry end of a conduit to cause a separation of the heavier particles at places along the length of the conduit spaced from the place of deposit and enabling the lighter particles to be collected at the discharge end of the conduit. This type of process is not very selective and its practical usefulness is substantially limited to the removal of particles of large sizes and high specific gravities from mixtures thereof. Recently more reliable methods have been devised for the classification of very fine particles, such as the introduction of the particulate material into a liquid flowing at a velocity slightly below the point where the material begins to deposit out of the flow and in such manner that the larger particles settle to the bottom of the conduit in the form of a dune, thereby enabling the lighter or smaller particles to be carried along downstream in the liquid flow. A more thorough separation of the particles and the separation of particles even lighter than those capable of being separated by other processes, was later attained by inclining the conduit so that the dune was caused to be more or less stationary and constantly agitated or stirred by the fluid. This improvement however also had its limitations as to the separation of very light particles. Thus, in French Patent No. 1,138,474 dated November 25, 1955, which is concerned with the processing of a mixture of particulate material by feeding it into a liquid flowing through an inclined tube so as to form a stationary dune, it is stated that sorting in this fashion is only possible for materials with particle diameters in excess of a few tenths of a millimetre and that for a material with a specific gravity of 2.65 in water, for example, this limit could be in the neighborhood of 0.3 to 0.4 mm. It is thus indicated that below this limit of diameter, the apparatus disclosed in the aforesaid patent is no longer sensitive to particle specific gravity and therefore would be unable to sort materials of such lightness. Tests with the apparatus of such French patent has also shown that the maximum permissible concentration at which materials could be conveyed through the sorting tube was about 50 grammes per litre, and that unsatisfactory sorting occurred above this limit.

I have found that it is possible to sort sizes below the aforesaid limits of density or grain size by conducting the separating operation in an inclined duct under conditions such that the Reynolds number for the flow in such duct is maintained in the vicinity of the laminar or streamline region.

In view of the fact that the order of magnitude of velocity of the sorting fluid must lie between the respective limit entrainment velocities for the heaviest and the lightest particles, I have found that in order to establish the aforesaid conditions the following requirements must be met:

(1) As the Reynolds number depends both on the flow velocity and the hydraulic radius of the sorting ducts cross-section, for such a given velocity of flow the duct must necessarily have a very reduced height as compared to its length. Systematic tests carried out by me have shown that when water is used as the fluid medium, Reynolds numbers in the vicinity of the laminar flow region are obtained in practice if the height of the sorting duct, as compared to its length, is kept down to less than 20 mms.

(2) The cross-sectional area of the lower part of the sorting duct should be restricted by a suitable sill on its floor. This feature I have found assures a good distribution of the flow at the entry of the duct, and a good distribution of the discharge of the heavier particles at the bottom end of the duct.

In accordance with my invention therefore, I have provided a procedure for sorting by density or by grain size, materials consisting of particles less than a few tenths of a millimeter in diameter, the essential features of the said procedure being that the sorting occurs inside an inclined duct having a height of less than 20 mm., and the floor of the lower part of which is provided with a suitably shaped sill. Such a construction also enables me to satisfactorily classify materials in substantially greater concentration than is possible with the inclined sorting tube of the aforesaid French patent.

The inclined sorting duct of the invention may be constituted of a single duct ranging in size from a diameter of less than 20 mms. to one of comparatively large width, or may be constituted of a group of small diameter ducts, or several groups of such ducts, each containing a specific number of ducts. Accordingly, where in the description herein and in the claims hereof, reference is made generally to a "sorting duct" it will be understood that such term may include a single duct, a group of ducts, or several groups of ducts.

I have found that as in accordance with the invention, the maximum permissible height for the sorting duct is 20 mms., it is necessary in order to provide a sorting flow which will be of practical use for commercial purposes, that the duct have a relatively large width, e.g. 200 mms. Thus, the cross-sectional area of a duct suitable for a commercial installation will be a substantially rectangular area having relatively short sides indicating the inside height of the duct, and relatively long top and bottom lines indicating the inside width of the duct. Tests have shown that it is important for best results to have the sorting duct mounted so that such top and bottom lines of the rectangular cross-sectional area thereof, be disposed precisely horizontal. If, for some reason, it is found difficult to ensure, the difficulty can be overcome by providing corrugations running across the duct floor. The sill itself at the bottom of the duct may also be provided with longitudinal corrugations, or some other suitable shape, to ensure a uniform discharge of the particles which have settled out in the sorting duct from the bottom of the apparatus.

In the practice of the invention, it has been found that the apparatus can readily handle a concentration of the particulate mixture conveyed through the sorting duct as high as 200 grammes per litre. With concentrations of such order, quite useful sorting flows can be achieved in comparatively restricted ducts and these latter can be multiplied to provide a system of any desired sorting capacity. Thus, if it is assumed that the sorting flow in each duct of a proposed system, is to have a concentration of 200 grammes of material per litre, the number of ducts required to make up an apparatus which will provide the required sorting for the proposed system can be readily calculated.

Whatever may be the number of ducts calculated to be employed in such a proposed system, the flow velocity of the sorting water in each of such ducts will be maintained at the same value determined for the mixture to be sorted and lying between the entrainment velocities of the heaviest and lightest particles in such mixture. Although, as has been indicated, the sorting process is designed to be carried on under flow conditions with a near-laminar Reynolds number because of the small duct height, the flow is nevertheless turbulent due to the particles in suspension. When the materials are fed into such a flow in the inclined sorting duct at the intermediate point in the latter's length, such materials are put into suspension in the flow and form an expanded mass that is subjected to a continuous special mixing action substantially throughout the length of the sorting duct so that the separating operation can be considered as taking place throughout the duct length.

As the sorting operation proceeds, it has been observed that owing to the relative motion of the particles in the mass subjected to such continuous mixing, and to the differences in their specific gravities or apparent weights, the particles sort themselves out continuously into density or apparent weight layers, with values decreasing from the bottom to the top of the duct. In a density sorting process for instance, the lighter particles will be carried up towards the top of the duct by the upward flowing stream and discharged, while the heavier particles will sink against the stream, moving toward the lower or upstream end of the duct. In such movement some of the heavier particles will travel along the duct floor, and others in the stream itself, and both will accumulate on the duct flood against the downstream part of the sill restricting the cross-section of the lower end of the duct. From there, the heavier particles gradually slide down the grooves in the sill to the bottom end of the duct, where they are discharged by suitable means.

The designing of an industrial installation which can be built to operate satisfactorily at adequate capacity while requiring a minimum degree of supervision and adjustment and in which are employed one or more groups of individual ducts, requires taking into consideration a certain number of factors. Thus, the rates of flow in the individual ducts in the group or groups must all be constant and equal while the apparatus is functioning. To accomplish this, means have to be provided at each downstream duct end to produce a loss of head of sufficient magnitude to ensure that the variable head losses in the duct, due to the introduction of the materials, the variations in the materials, the mixing process, or any other cause, are negligible by comparison. This loss of head at the downstream end of each duct must be the same in each of the ducts.

Care must also be taken that the lengths of the several paths along which the fluid and materials travel in the complete hydraulic circuit are all the same. Further, all of the ducts in each group, and if several groups of ducts are employed, all of the ducts in all the groups, should slope at the same angle, and in the latter case, the bottom end of each group should be set at the same height so as to ensure that the sorting duct intakes and outlets of all of the groups are all practically at the same level.

Special means should also be provided to feed the materials into each duct in roughly equal quantities. The materials may in accordance with the invention be fed to the sorting ducts through individual pipes connected at their discharge ends to orifices in the side walls of the ducts and located at the same intermediate point in each of the ducts. The roughly equal amounts of materials which are fed through the supply pipes into the ducts may be provided by means of a suitable distributing device located upstream from the group or groups of supply pipes connected to the supply ducts. Such a distributing device may comprise, for example, a rotary distributor of the type disclosed in U.S. Patent No. 2,948,396, dated August 9, 1960, and constructed and arranged to introduce equal quantities of the materials to be sorted into each feed pipe in succession. While such a feed is discontinuous, each of the sorting ducts will operate satisfactorily provided the feed is controlled so that the quantity of material in each batch fed does not exceed about one-tenth of the total quantity of the material in the sorting duct.

The characteristics of the process of the present invention, as well as the novel features of the apparatus to be utilized in the practice of such process, will be better understood from the following description in which is described by way of example a possible sorting duct construction embodying the invention, and a possible commercial sorting installation having a satisfactory industrial flow rate and designed to separate out the indivdual constituents of a mixture consisting of two materials of different specific gravities and of a particle size less than 0.4 mm. The description should be read in connection with the accompanying drawings, in which FIG. 1 is a perspective view of a sorting duct embodying the present invention; the top wall of the duct being omitted for the sake of clearness;

FIG. 5 is a detailed side elevational view illustrating how several groups of sorting ducts may be arranged in a commercial installation of the type indicated in FIG. 4.

Figure 1:
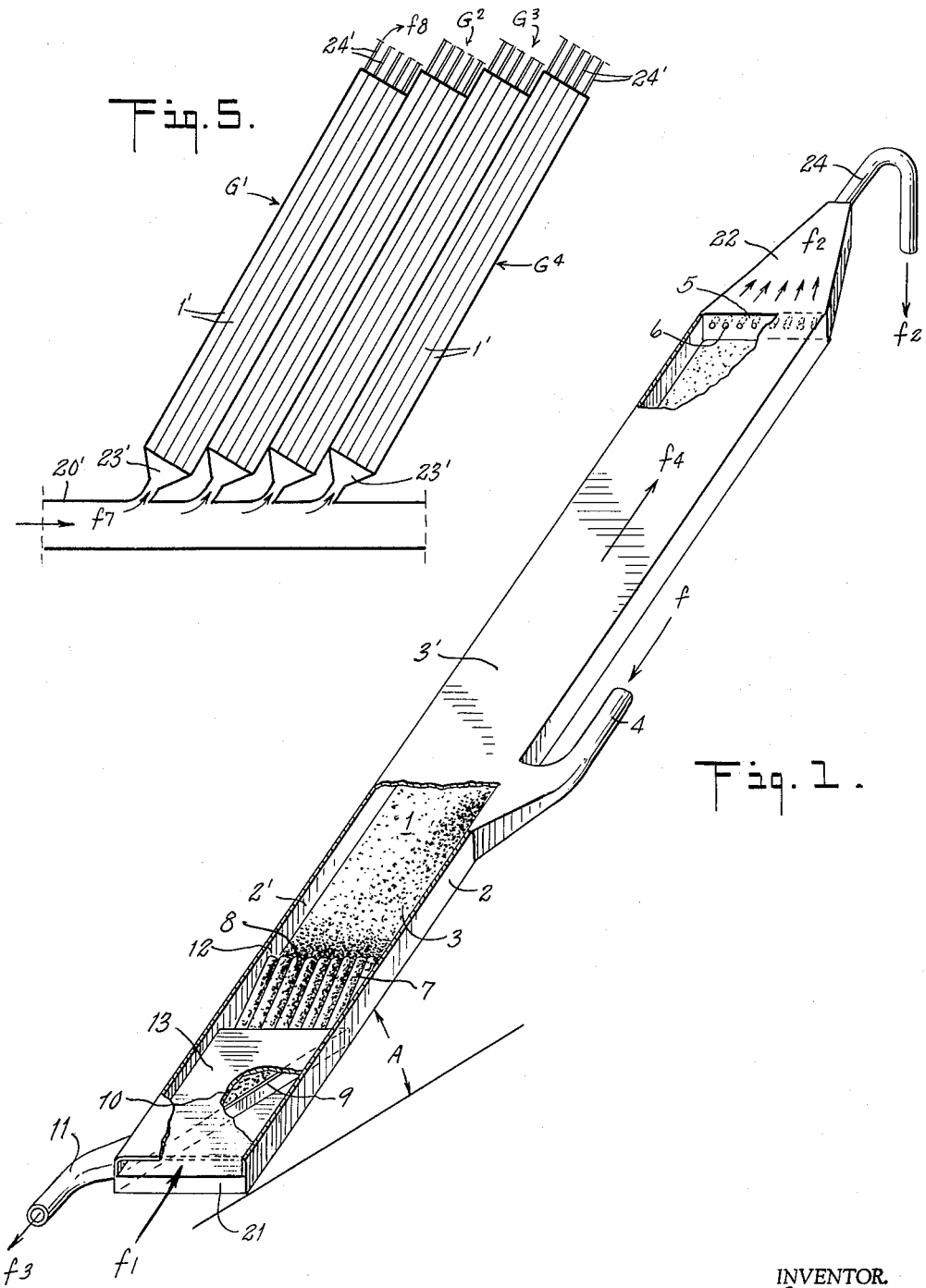
Figure 2:
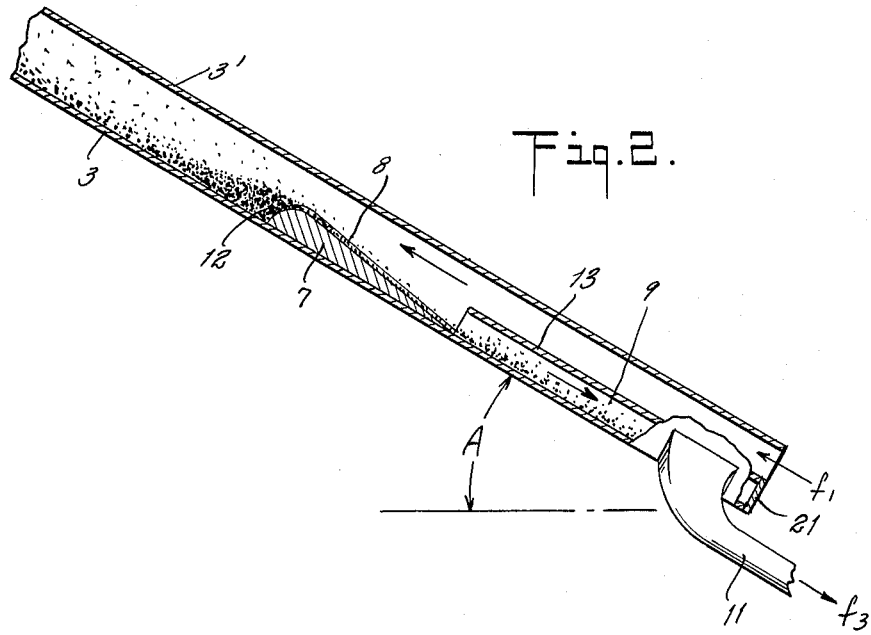
FIG. 2 is a side elevation of the lower portion of the duct shown in FIG. 1 and with a side wall of such duct portion removed to show its construction more clearly.
Figure 3:
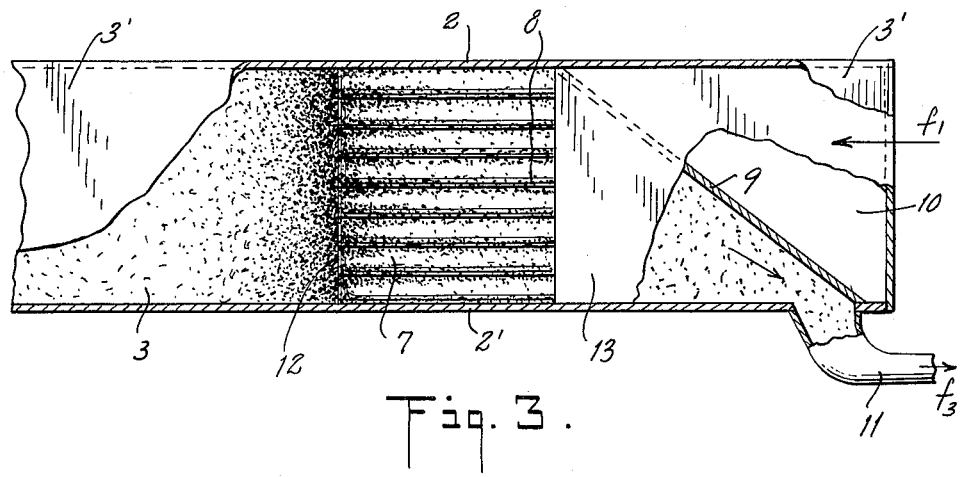
FIG. 3 is a top plan view of the portion of the duct shown in FIG. 2 with the top wall of such portion removed.

The sorting duct illustrated in FIGS. 1 to 3 of the drawings is indicated generally by the reference numeral 1 and is composed of two plane longitudinally extending side walls 2, 2' approximately 20 mm. high, a plane longitudinally extending bottom wall or floor 3 approximately 200 mm. wide, and a flat top wall 3' (note FIG. 2) substantially similar in dimensions to the floor 3. The walls 2, 2', 3, 3' therefore define a rectangularly-shaped duct which is very wide compared to its height and is elongated, being approximately eight times longer than its width in the embodiment illustrated. The inside rectangularly-shaped cross-sectional area defined by such walls will have relatively short sides of less than 20 mm. length and top and bottom sides of approximately 200 mm. length. The duct is mounted so that it is inclined at an angle A of 60° with respect to the horizontal and so that the bottom sides of the inside cross-sectional areas thereof are horizontally disposed. In other words, the floor 3 of the duct throughout its entire width will be disposed at the same angle to the horizontal. This latter feature is an essential requirement for the proper operation of this form of duct as a sorting apparatus in accordance with the invention.

The mixture to be sorted, which consists of particles less than 0.4 mm. in diameter and having two different specific gravities, is fed into the duct through a conduit 4 as is indicated by the arrow $f$ in FIG. 1 of the drawings. The conduit 4 is connected to the side wall 2 of the sorting duct at a point intermediate the two duct ends. The rate of feed of the mixture is regulated to give a transported concentration of 200 grammes per litre.

The sorting water is fed into the bottom of the duct as is indicated by the arrow $f_1$ and flows upwardly toward the top end of the duct where it and the suspended lighter particles of the mixture are discharged through a plurality of holes 6 provided in a transverse top end plate 5. The discharged water and lighter particles pass through a funnel-shaped top end portion 22 and into a pipe 24, as is indicated by the arrows $f_2$. The pipe 24 delivers the the discharged mixture to some suitable known means for extracting the lighter particles from the water, such as a settling tank of known construction (note the tank 25 in FIG. 4) from which the light particles may be removed by decantation. Suitable means are provided, such as the means shown in FIG. 4 of the drawings, to provide the water passing through the sorting duct with a given flow velocity lying between the limit entrainment velocities for the heaviest and lightest particles in the mixture.

The transverse top end plate 5 is provided in order to set up a head loss which will be so high compared to the head losses inside the sorting duct that the latter will be negligible, thus ensuring the constant flow required when the duct is used in conjunction with several others in a group to obtain the sorting capacity desired.

Spaced upwardly from the terminal bottom end of the duct is a specially shaped sill type restrictor 7 mounted on the bottom wall or floor 3 of the duct. As is shown more clearly in FIGS. 2 and 3 of the drawings, the sill is somewhat wedge-shaped in cross-section, and has an enlarged rounded end 12 disposed downstream with relation to the sorting water flow $f_1$ and from such rounded end gradually diminishes in thickness in the upstream direction with relation to such flow $f_1$ so as to present a transverse inclined upper surface to the flow of liquid. The upper inclined surface of the sill is made somewhat corrugated in shape to provide a plurality of longitudinally extending grooves 8. The grooves 8 ensure a uniform discharge of the deposited particles which collect against the downstream rounded end 12 of the sill and thereby stabilize the discharge of the solid materials across the entire width of the duct.

At the upstream end portion of the duct there is formed a chamber 10 located between the floor 3 of the duct and a longitudinal partition 13 disposed in parallelism to such floor and spaced upwardly therefrom a distance equal to about one-third of the duct height. The chamber 10 is divided by a diagonal partition or wall 9 which extends from a point on the duct side wall 2' adjacent the end wall 21 of such chamber, diagonally across the duct in a downstream direction to a point on the side wall 2 at the downstream end of such chamber and adjacent to the sill 7. The area of chamber 10 bounded by the duct floor 3, duct side wall 2', longitudinal partition 13 and wall 9, funnels the heavy particles discharging from the upstream ends of all of the sill grooves 8 into an outlet 11 connected to the duct side wall 2' at the upstream end of the latter, as is indicated in FIGS. 1 to 3 by the arrows $f_3$.

The sorting water is fed into the duct 10 above the chamber 10 and passes over such chamber and over the sill 7 to enter into the sorting chamber of the duct between such sill and the top end plate 5. The particles discharging into the flow in such sorting chamber from the pipe 4 go into suspension immediately fanning out from the discharge end of such pipe to form an expanded mass which extends over substantially the entire area of the duct sorting chamber and in which mass the particles undergo a constant mixing action. As a result of this continuous mixing motion of the particles those which are lightest will be carried upwards by the rising current and discharge with the water through the orifices 6 in the top end plate 5, while the heavier particles will sink against the stream to the bottom or upstream end of the duct, some of these heavier particles traveling along the duct floor 3 and others of such heavier particles actually traveling upstream within the stream in a lower layer of the latter positioned below the height of the downstream end 12 of the sill-type restrictor at the bottom end of the sorting chamber in the duct. As above indicated, this expanded mass extends practically from the downstream end 12 of the sill restrictor 7 to the top end plate 5.

Both the heavier particles traveling upstream along the duct floor 3 and the heavier particles sinking upstream within the stream strike against and accumulate against the downstream end 12 of the sill and then travel along the still grooves 8 and into the funnelled portion of chamber 10 which directs them into the outlet pipe 11 as has been previously explained and as is indicated in the drawings by the arrows $f_3$.

Figure 4:
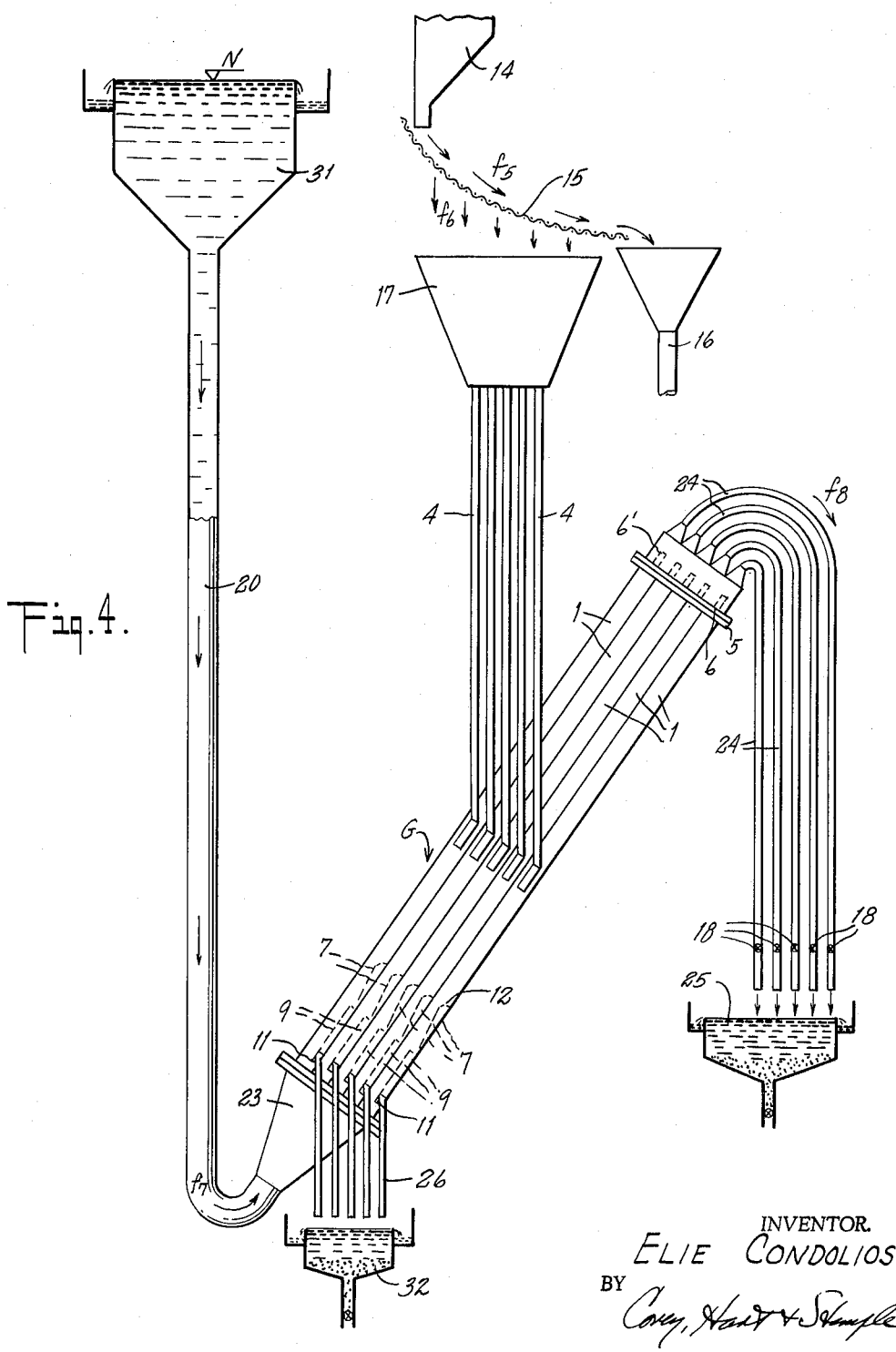
FIG. 4 is a schematic side elevational view of a possible commercial sorting installation embodying the invention.

In FIG. 4 of the drawings there is illustrated an installation capable of producing an industrial rate of flow and which is designed to sort a mixture of siliceous sand having a specific gravity of 2.65 and titanium ore having a mean specific gravity of 4.2, the particle diameters in the mixture ranging from 0.1 to 0.4 mm.

The sorting apparatus is composed of five ducts 1, arranged in inclined overlying relation on one another to form a compact group G thereof. Each of the ducts in the group is constructed substantially similar to the duct 1 shown in FIGS. 1 to 3 of the drawings and functions in a similar manner. Accordingly, the material feed pipes 4, top end plate 5 with its openings 6, sills 7, diagonal partitions 9 and outlet pipes 11 of the ducts shown in FIG. 4 have been indicated with the same reference numerals as the like parts of the previously described sorting duct. Each of the ducts 1 in the group are dimensioned to provide an inside height of 16 mms. and an inside width of 200 mms. With ducts so dimensioned and with a water velocity of 15 centimeters per second and a material transport concentration of 200 grammes per litre, the installation is enabled to process the said mixture at a rate of 1.7 metric tons per hour.

The feed pipes 4 which are connected at the same intermediate point in each side wall of the ducts extend vertically upwardly in substantial parallelism and are connected at their upper ends to the discharge end of a distribution hopper 17. Disposed over the hopper 17 is a concave screen 15 of 0.4 mm. mesh. The bulk material with a certain amount of water added, discharges from a storage hopper 14 onto the screen 15 as is indicated in FIG. 4 by the arrows $f_5$. That part of the bulk material which passes through the screen falls into the hopper 17, as is indicated by the arrows $f_6$, the latter of which channels the material into the five feed pipes 4. It will be understood that although the materials which reach the feed pipes 4 contain a certain amount of water, they may also be fed in dry in certain cases. That part of the bulk material which is rejected by the screen (particle sizes above 0.4 mm.) discharges into an outlet duct 16.

The sorting water for the particulate material is supplied by a constant level tank 31 which may be maintained automatically at a constant level N by any suitable float valve control mechanism known in the art. The water passes from the tank 31 through a feeder pipe 20 and a funnel-shaped connection 23 which simultaneously feeds the water from pipe 20 into the entry ends of all of the five sorting ducts 1, all as is indicated by the arrows designated $f_7$. The sorting water then passes through each of the sorting ducts to accomplish the sorting operation in the manner previously described in detail with respect to the embodiment of FIGS. 1 to 3. Most of the water passing through the sorting ducts 1 discharges through the orifices 6 in the duct top end plates 5, which orifices may be provided with suitable wearing rings 6'. The discharging streams of water with the lighter particles entrained therein, enter into the individual discharge pipes 24 and pass through the latter, in the direction indicated by the arrows $f_8$, to a settling tank 25 from which the light particles are recovered by decantation. Each of the pipes 24 adjacent to its discharge end is provided with a discharge valve 18 which is adjustable to control the rate of flow of the water through its associated sorting duct 1. All of the valves 18 are adjusted so that the rates of flow of the sorting water in all of the ducts are maintained at the same value.

Equal flow rates of the sorting water that remain constant throughout the operation of the apparatus are ensured in each sorting duct by its associated assembly which consists of the orifice plate 5, the pipe 24 and the said valve 18. Each of these assemblies are constructed to provide a high loss of head of practically the same value for its associated sorting duct and of such magnitude that the head losses occurring within such associated duct during the operation thereof will be comparatively negligible. The holes 6 in the orifice plate 5 at the downstream end of each sorting duct are of such size and spacing that they equalize the flow velocities over the whole width of such sorting duct.

The heavier particles separate out in each of the sorting ducts in the manner previously explained and in a like manner pass over the associated sills 7 and through the chambers with the diagonal partitions 9 to the outlets 11 at the bottom ends of the five sorting ducts. Each of the outlets 11 has connected thereto a discharge pipe 26 which conducts the discharged heavier particles to a settling tank 32 from which they are recovered after settling out. The diameter of each pipe 26 is such that its flow is about one-tenth less than that of its associated pipe 24, so that its effect on the flow adjustment provided by valve 18 is practically negligible.

If in a commercial installation such as depicted in FIG. 4 it is desired to provide a greater rate of industrial flow than is possible with five sorting ducts, it is possible to increase such rate by substituting for the single group of five ducts shown in FIG. 4 a plurality of groups each composed of five ducts such as shown in FIG. 5 of the drawings. Such groups of five ducts each are indicated generally by the reference characters $G^1$, $G^2$, $G^3$ and $G^4$. Additional of such groups may be connected to the feeder pipe 20' for the sorting water to provide the rate of industrial flow desired. It will be observed from FIG. 5, that all of the sorting ducts 1' in all of the groups $G^1$, $G^2$, $G^3$ and $G^4$ slope at the same angle and that the bottom ends of the groups are joined to the feeder pipe 20' by the connectors 23' so that the bottom ends of all of the groups are set at the same height. It will be understood that the sorting pipes 1' of each group will be connected by material feed pipes 4 to a source of material feed in the manner indicated in FIG. 4 and that the discharge pipes 24' thereof will be connected to a settling tank or other suitable particle separating means in the manner indicated in FIG. 4 of the drawings.

While I have illustrated and described several embodiments of my invention by way of example, it will be understood that the invention is not restricted to such embodiments, but may be utilized in many variations of the same with changes in the designs of its various components or in the relative positions of such components. Thus the position of the orifice through which the materials are fed into the apparatus may be varied and different designs may be adopted for the sill restrictor and the discharge chambers associated therewith. Hence it is my intention to cover all embodiments of the invention coming within the scope of the appended claims.

I claim:

1. The method of separating a mixture of particulate solid materials into a plurality of fractions differing according to their differences of density and/or particle size, in an inclined, closed, elongated sorting chamber which is substantially straight and slopes at substantially the same angle throughout its length, and which throughout the major portion of its length has substantially similar cross-sectional areas with substantially horizontally disposed transverse axes and a maximum height such as to enable the provision of flow conditions in such chamber such that the Reynolds number for the upward flow therein of a sorting fluid at a given velocity between the respective entrainment velocities of the particles to be separated will be in the vicinity of the laminar region, comprising the steps of establishing the velocity of flow of the sorting fluid in such given sorting chamber so that the sorting fluid will fill the chamber and will pass upwardly therethrough at said given velocity satisfying the Reynolds formula and being between the respective entrainment velocities of the particles to be separated, and introducing into the sorting fluid passing upwardly through such given sorting chamber a mixture of particulate solid material containing particles having an entrainment velocity limit less than said given velocity and particles having an entrainment velocity limit greater than such given velocity so as to enable them to sink against the flow of the sorting fluid toward the bottom of said included sorting chamber.

2. The method of separating a mixture of particulate solid materials into a plurality of fractions differing according to their differences of density and/or particle size, in an inclined, closed, elongated sorting chamber having a reduced lower sorting fluid inlet and a reduced upper fluid discharge, and which intermediate such inlet and discharge is substantially straight and slopes at substantially the same angle throughout the length thereof, and which throughout the major portion of such length has substantially similar cross-sectional areas with substantially horizontally disposed transverse axes and a maximum height such as to enable the provision of flow conditions in such chamber such that the Reynolds number for the upward flow therein of a sorting fluid at a given velocity between the respective entrainment velocities of the particles to be separated will be in the vicinity of the laminar region, comprising the steps of establishing the velocity of flow of the sorting fluid in such given sorting chamber so that the sorting fluid will fill the chamber and will pass upwardly therethrough at said given velocity satisfying the Reynolds formula and being between the respective entrainment velocities of the particles to be separated, and introducing into the sorting fluid passing upwardly through such given sorting chamber a mixture of particulate solid material consisting of particles less than a few tenths of a millimeter in diameter and containing particles having an entrainment velocity limit less than said given velocity and particles having an entrainment velocity limit greater than such given velocity so as to enable them to sink against the flow of the sorting fluid toward the bottom of said inclined sorting chamber.

3. The method of separating a mixture of particulate solid materials into a plurality of fractions differing according to their differences of density and/or particle size, in an inclined, closed, elongated sorting chamber having a reduced lower sorting fluid inlet and a reduced upper fluid discharge, and which intermediate such inlet and discharge is substantially straight and slopes at substantially the same angle throughout the length thereof, and which throughout the major portion of such length has substantially similar cross-sectional areas with substantially horizontally disposed transverse axes and a maximum height such as to enable the provision of flow conditions in such chamber such that the Reynolds number for the upward flow therein of a sorting fluid at a given velocity between the respective entrainment velocities of the particles to be separated will be in the vicinity of the laminar region, comprising the steps of establishing the velocity of flow of the sorting fluid in such given sorting chamber so that the sorting fluid will fill the chamber and will pass upwardly therethrough at said given velocity satisfying the Reynolds formula and being between the respective entrainment velocities of the particles to be separated, and introducing into the sorting fluid passing upwardly through such given sorting chamber at a point located intermediate the lower and upper ends of said chamber, a mixture of particulate solid material containing particles having an entrainment velocity limit less than said given velocity and particles having an entrainment velocity limit greater than such given velocity so as to enable them to sink against the flow of the sorting fluid toward the bottom of said inclined sorting chamber, and providing a barrier across the lower portion of the cross-sectional area of said chamber between said point of feed and the place of entry of the sorting fluid into the chamber to collect the particles sinking against the flow of the sorting fluid.

4. A method such as defined in claim 3, in which the passageway of said chamber is provided with a rectangular cross-section that has a height very much smaller than its width to reduce as much as possible the value of the Reynolds number at said given velocity, and in which said supply of mixture is fed into said fluid flow through a side of said chamber so that the particles may readily expand out over the area of such chamber between the closely spaced top and bottom walls thereof.

5. A method such as defined in claim 3, including the steps of draining off particles from the heap thereof collecting against the downstream side of said barrier, and discharging such drained off particles from the chamber.

6. A method such as defined in claim 3, including producing across the entire cross-sectional area at the downstream end of said chamber before the reduced fluid discharge so as to cause the flow to be distributed evenly throughout the cross sectional area of the chamber, such loss of head that the variable head losses in such chamber will be substantially negligible.

7. Apparatus for separating a mixture of particulate solid materials into a plurality of fractions differing according to their differences of density and/or particle size, comprising an inclined, closed duct defining a sorting chamber of rectangular cross-section and in which the height thereof is very small compared to its width, said sorting chamber being substantially straight and sloping at substantially the same angle throughout its length, the cross-sectional areas of such chamber throughout its length being substantially similar and having substantially horizontally disposed bottom sides and heights of a given maximum such that the Reynolds number for the flow at a given velocity is less than the value corresponding to laminar flow conditions, sill means extending upwardly from the floor of said duct at the lower end portion and across the entire width of said chamber thereof to restrict the duct passageway at such lower end portion, means for feeding a sorting fluid into the lower end of said duct at a place located below said sill means and so that such fluid passes through the duct at a given velocity between the respective entrainment velocities of the particles to be separated, and means for introducing said mixture into the sorting fluid passing through said duct at a place located between said sill means and the upper end of said duct, the particles having a velocity limit greater than said given velocity sinking against the flow of the sorting fluid towards said sill means which operates to collect the same, said sill means being formed to permit the discharge of the particles collected thereby.

8. Apparatus for separating a mixture of particulate solid materials into a plurality of fractions differing according to their differences of density and/or particle size, comprising an inclined, closed duct having a sorting chamber of a height not substantially greater than 20 mms. and having at the lower end portion thereof a sill means extending upwardly from the floor thereof and across the width thereof to restrict the duct passageway at such end portion to an area above said sill means, said sorting chamber being substantially straight and sloping at substantially the same angle throughout its length, the cross-sectional areas of such chamber throughout its length being substantially similar and having substantially horizontally disposed bottom sides, means for feeding a sorting fluid into the lower end of said duct at a place located below said sill means and so that such fluid passes through the duct at a given velocity between the respective entrainment velocities of the particles to be separated, means for feeding a supply of said mixture to said duct in a form consisting of particles less than a millimeter in diameter and for introducing said particles into the sorting fluid passing through said duct at a place located between said sill means and the upper end of said duct, those particles having a velocity limit greater than said given velocity sinking against the flow of the sorting fluid towards said sill means which operates to collect the same, said sill means being formed to permit the discharge of the particles collected thereby.

9. Apparatus for separating a mixture of particulate solid materials into a plurality of fractions differing according to their differences of density and/or particle size, comprising an inclined, closed conduit defining a substantially straight sorting chamber that throughout its length slopes at substantially the same angle and has substantially similar cross-sectional areas with substantially horizontally disposed bottom sides and of such configuration that the Reynolds number for the flow of the sorting fluid therethrough at a given velocity is in the vicinity of the laminar region and is such that particles of the mixture having a velocity limit in the sorting fluid greater than said given velocity are enabled to sink against the flow of the sorting fluid towards the bottom of the sorting chamber formed in the fluid passageway of said conduit, means at the bottom end of such sorting chamber providing a barrier across the lower portion of the cross-sectional area of such fluid passageway to collect the particles sinking against the flow of the sorting fluid into a heap, means for feeding the sorting fluid into the lower end of said conduit at a place located below said barrier and so that such fluid passes through the conduit at a given velocity between the respective entrainment velocities of the particles to be separated, means for feeding said mixture into the sorting fluid passing through said conduit at a place located between said barrier and the upper end of the sorting chamber formed in said conduit passageway, the particles having a velocity limit greater than said given velocity sinking against the flow of the sorting fluid towards said barrier which operates to collect the same, and a reduced fluid discharge at the upper end of said conduit above the upper end of such sorting chamber for the sorting fluid passing through such chamber.

10. Apparatus such as defined in claim 9, in which the fluid passageway of said conduit in the region of the sorting chamber formed therein is of rectangular cross-section and has a height very much smaller than the width thereof, and in which said mixture feeding means discharges the mixture through a narrow side wall of said sorting chamber into the wide thin stream of sorting fluid between the closely spaced top and bottom walls of such chamber.

11. Apparatus such as defined in claim 9, in which the upper side of said barrier is configured to drain off the top of the heap of particles collecting against the downstream side thereof.

12. Apparatus such as defined in claim 9, in which said barrier is configured to discharge particles from the heap thereof collecting against the downstream side of said barrier, and including means for conducting such discharged particles from the conduit.

13. Apparatus such as defined in claim 12, in which the configuration of said barrier is such that the particles are discharged from such heap substantially uniformily across the width of said conduit.

14. Apparatus such as defined in claim 11 in which said barrier is provided on its upper side with a plurality of longitudinally extending particle conducting grooves.

15. Apparatus such as defined in claim 12, in which said conducting means includes a funnel shaped chamber formed in said conduit between said barrier and said place of entry of the sorting fluid, the wide end of said funnel being closely adjacent to the upstream side of said barrier and having a width substantially equal to the cross width of said barrier, and an outlet connected to the narrow end of said funnel.

16. Apparatus such as defined in claim 9 including means for producing at the downstream end of said conduit such loss of head that the variable head losses in such chamber will be substantially negligible.

17. Apparatus such as defined in claim 16 in which such producing means comprises an end plate located at the downstream end of the sorting chamber formed in the fluid passageway of said conduit and before said reduced fluid discharge, said end plate having a cross-sectional area substantially the same as that of said sorting chamber so as to cause the fluid flow to be distributed evenly throughout the cross-sectional area of the chamber and forming the upper end wall thereof, said end plate being provided with a plurality of openings through which the sorting fluid discharges from said sorting chamber to said fluid discharge.

18. Apparatus such as defined in claim 9, including a plurality of like conduits grouped together, a common means for feeding sorting fluid to the entry ends of all of said conduits, a plurality of like means for discharging the sorting fluid and the entrained light particles from the downstream ends of each of said conduits, a plurality of like means for feeding the mixture to each of said conduits, and a plurality of like means for discharging the deposited particles from each conduit, the lengths of the paths along which the sorting fluid and the materials travel through said conduits and said feeding and discharging means being substantially the same.

19. Apparatus such as defined in claim 9, including a plurality of like conduits grouped together and each connected in a similar manner to said sorting fluid and said mixture feeding means, and means for insuring that the rates of flow in each of said grouped conduits remain constant and equal during the operation of the apparatus.

20. Apparatus such as defined in claim 19, in which said grouped conduits are grouped together into a plurality of groups each of which includes a plurality of like conduits, each of said groups sloping at the same angle and having their bottom ends set at the same height so that the places of entry for the sorting fluid for all of the groups are substantially at the same level.

References Cited by the Examiner

UNITED STATES PATENTS

| 2,946,438 | 7/1960 | Belugou | 209—156 |
| 2,946,439 | 7/1960 | Condolios | 209—157 |
| 2,948,396 | 8/1960 | Condolios | 209—156 |
| 2,983,382 | 5/1961 | Russell | 209—458 |
| 3,042,204 | 7/1962 | Eder | 209—157 |

FOREIGN PATENTS 1,138,474  1/1957  France.

HARRY B. THORNTON, *Primary Examiner.*
ROBERT A. O'LEARY, *Examiner.*